July 27, 1965  T. A. RATKOWSKI  3,196,956
DIGGER TOOTH
Filed Dec. 21, 1962  4 Sheets-Sheet 1
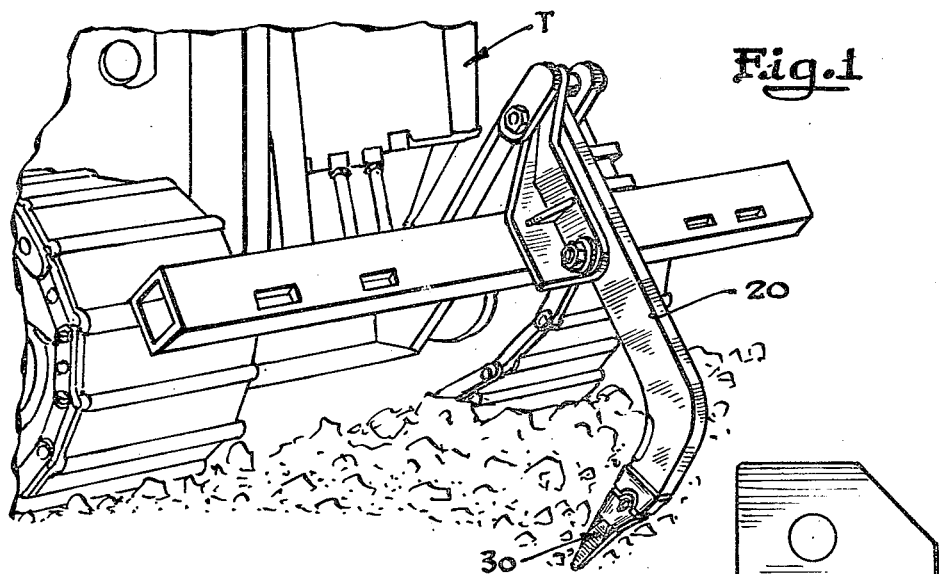
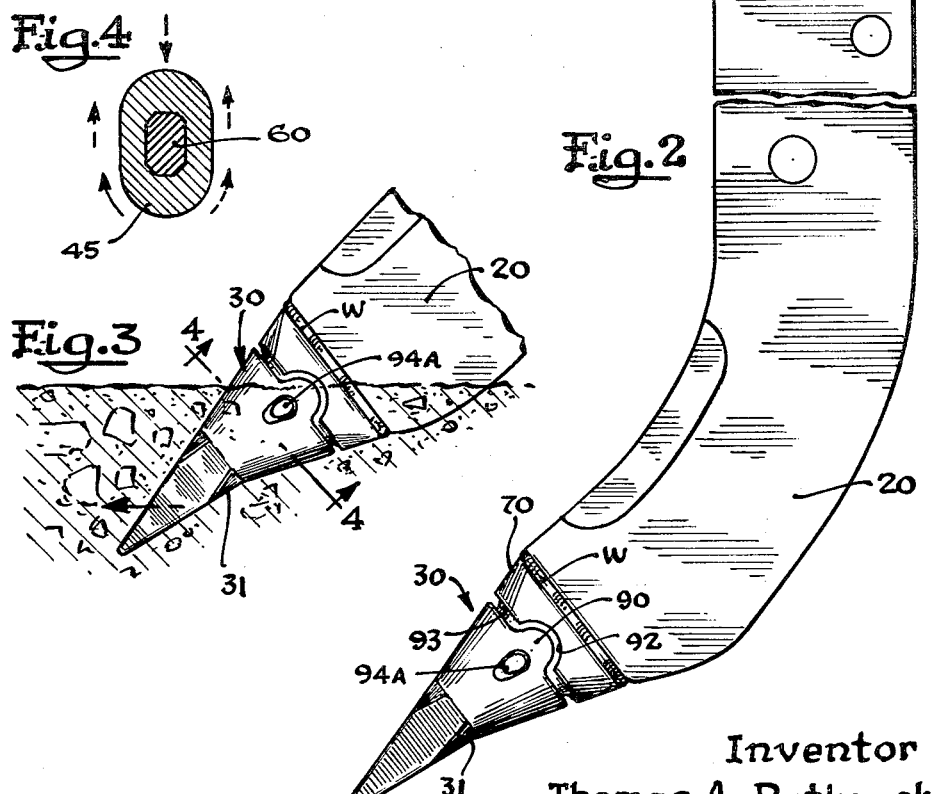
Inventor
Thomas A. Ratkowski
By Wallace, Kinzer and Dorn
Attorneys July 27, 1965  T. A. RATKOWSKI  3,196,956
DIGGER TOOTH
Filed Dec. 21, 1962  4 Sheets-Sheet 2
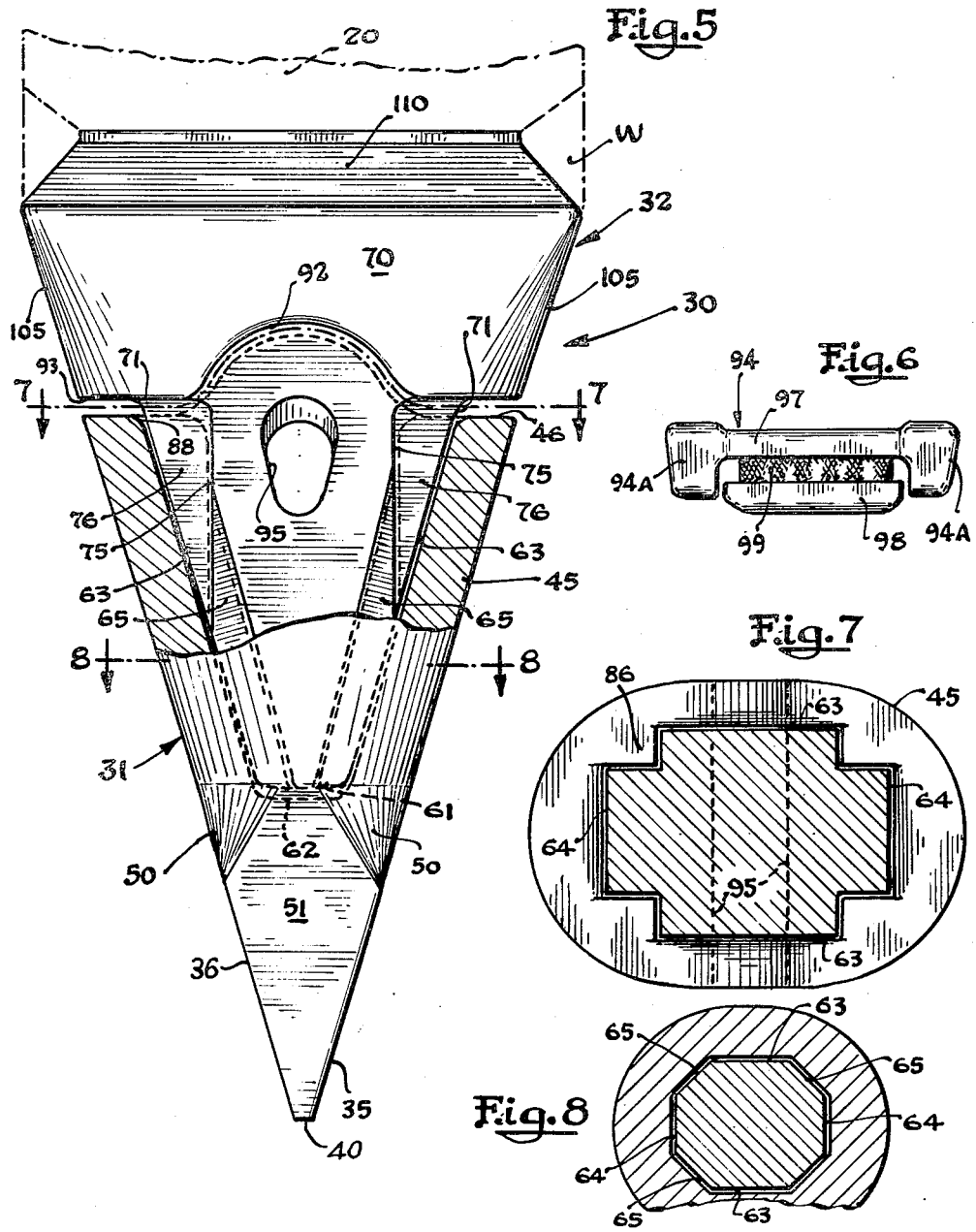
Inventor
Thomas A. Ratkowski
By Wallace, Kinzer and Dorn
Attorneys July 27, 1965   T. A. RATKOWSKI   3,196,956
DIGGER TOOTH
Filed Dec. 21, 1962   4 Sheets-Sheet 3
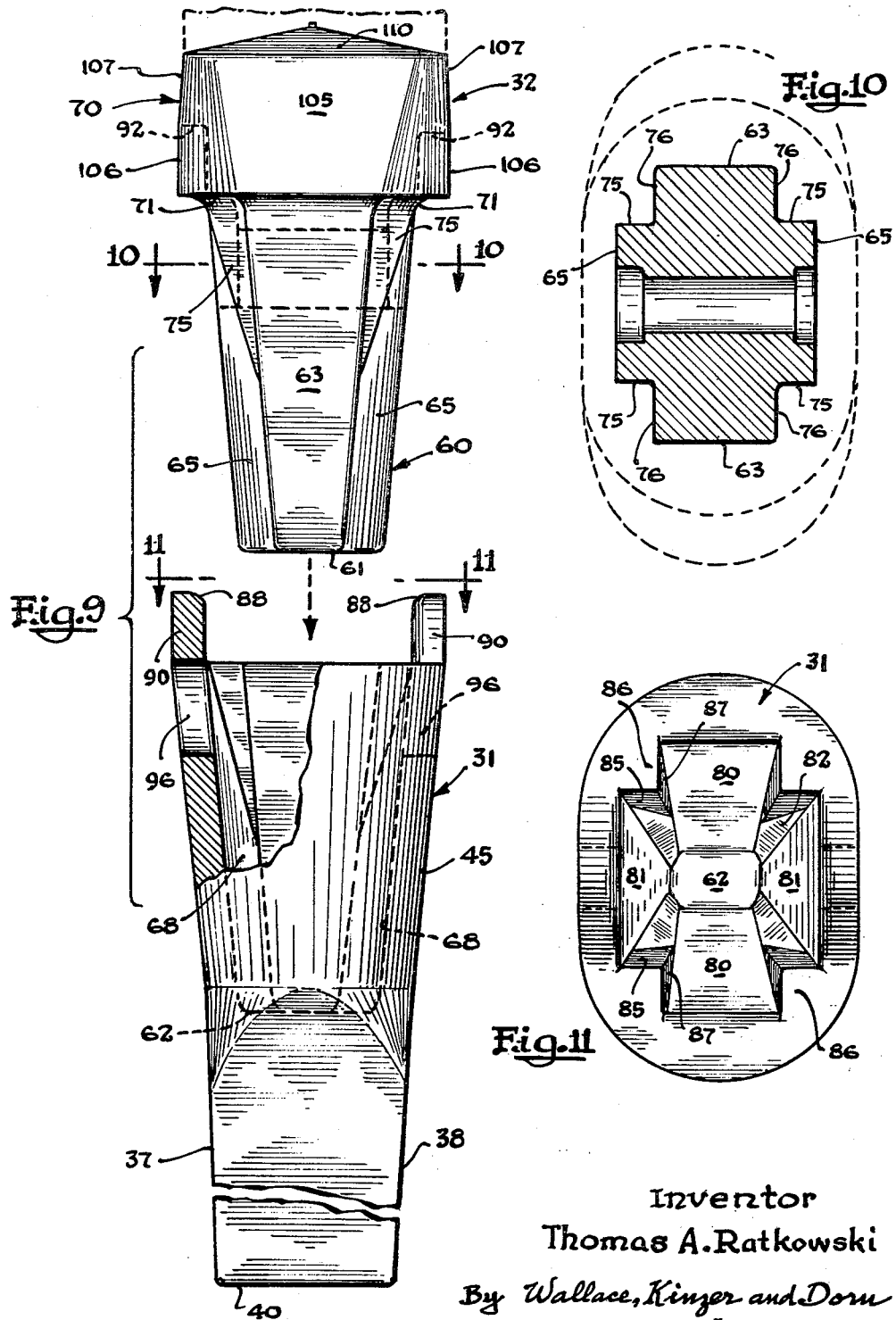
Inventor
Thomas A. Ratkowski
By Wallace, Kinzer and Dorn
Attorneys July 27, 1965     T. A. RATKOWSKI     3,196,956
DIGGER TOOTH
Filed Dec. 21, 1962     4 Sheets-Sheet 4
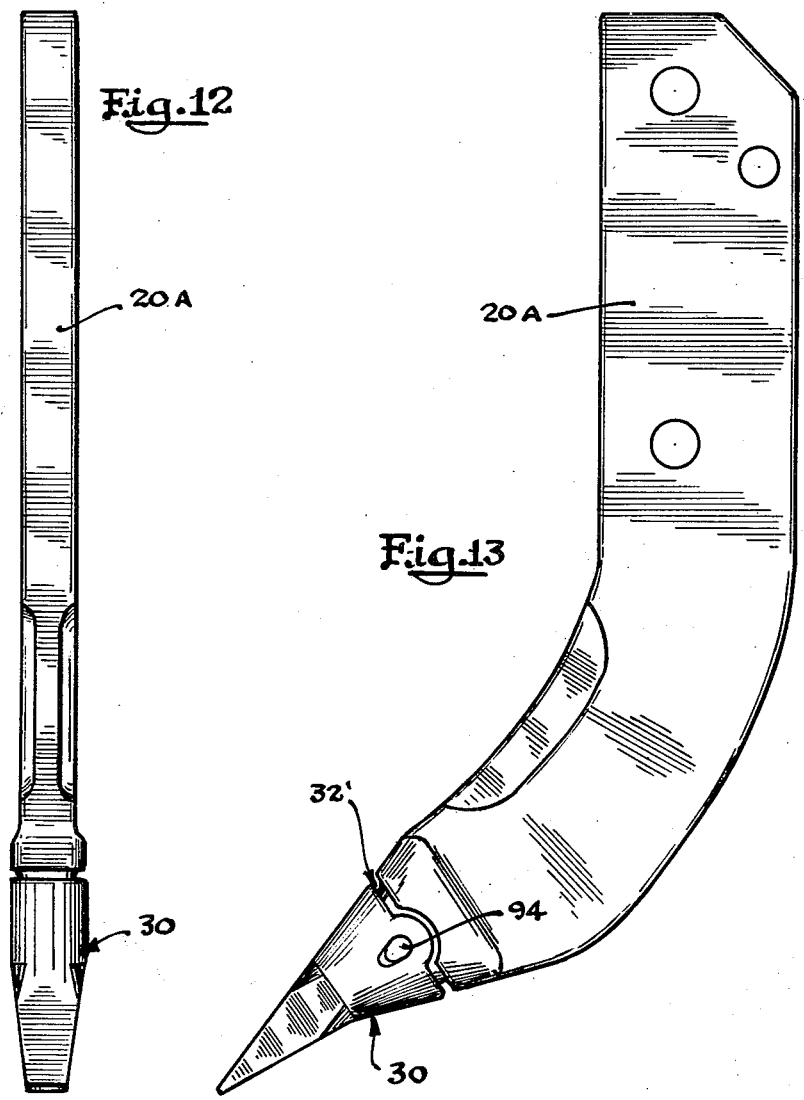
Inventor
Thomas A. Ratkowski
By Wallace, Kinzer and Dorn
Attorneys

United States Patent Office 3,196,956
Patented July 27, 1965

1

3,196,956
DIGGER TOOTH
Thomas A. Ratkowski, Chicago Heights, Ill., assignor to American Brake Shoe Company, New York, N.Y., a corporation of Delaware
Filed Dec. 21, 1962, Ser. No. 246,634
5 Claims. (Cl. 172—713)

This invention relates to digger teeth such as those used for trenching, ripping and excavating operations.

Digger teeth of the kind contemplated under the present invention are used primarily in connection with ripping or trenching operations wherein the tooth, carried by a shank, is caused to penetrate the earth and then is pushed or pulled therethrough. It will be realized that the working forces involved are quite tremendous, particularly where rocky soil is involved, and one of the primary objects of the present invention is to construct a digger tooth of the general character involved so that the tooth, after penetrating the ground, will have a comparatively streamlined movement through the ground when a pull is imparted thereto.

Another object of the present invention is to construct such a tooth of two-part form including a cap or point adapted to be reversably mounted on a so-called adapter, the latter in turn being the part of the tooth that is fixed to the shank of the power equipment. A related object of the present invention is to construct the point with a socket portion characterized by quite heavy side wall sections that impart substantial strength thereto and which afford generous bearing contact with complemental surfaces on the adapter.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the perview of the appended claims.

In the drawings:

FIG. 1 is a perspective view at the working end of a tractor equipped with a digger tooth of the present invention;

FIG. 2 is a side elevational view of the shank part of said tractor equipped with a tooth of the present invention;

FIG. 3 is a view illustrating the manner in which the present tooth penetrates the ground;

FIG. 4 is a view illustrating the streamline feature of the present tooth;

FIG. 5 is an elevational view, partly in section, of the present tooth, and on an enlarged scale in comparison to FIG. 2;

FIG. 6 is a view of one form of retainer;

FIGS. 7 and 8 are sectional views on the lines 7—7 and 8—8 of FIG. 5;

FIG. 9 is an assembly view, partly in section, showing the manner in which the cap or point of the tooth is to be related to the adapter;

FIG. 10 is a section view on the line 10—10 of FIG. 9;

FIG. 11 is an end view on the line 11—11 of FIG. 9;

FIG. 12 is a front elevational view of the shank and tooth shown in FIG. 13; and FIG. 13 is a side elevation of a shank and tooth representing a modified form of the present invention.

FIG. 1 of the drawing illustrates the front end of a track-type tractor T, equipped with a ripper shank 20 having a ripper tooth 30 removably secured thereto by a retainer pin in the manner explained hereinafter. The tooth 30 is specifically designated a ripper tooth in the art, because of the nature of the work intended to be performed thereby, but it will be appreciated that there are other uses for a tooth as 30 as will be apparent from the description to follow.

The tooth 30 includes a point or cap 31, FIG. 5, removably related to an adapter 32 and capable of being reversed or inverted thereon. The point is secured to the adapter by a replaceable pin, and the adapter in turn is secured to the shank 20, in a manner hereinafter explained. Such reversal of the point on the adapter is usually performed after one side of the point has been worn down appreciably as an incident to use, thereby to present the fresh or less worn opposite side for further action.

The point or cap 31 embodies compound contours. The forwardmost end thereof is in the form of a solid, wedge-shaped digging blade, the external contour of which includes flat rearwardly divergent opposed front and backwalls 35 and 36, and a pair of opposed flat side walls 37 and 38 that are very slightly divergent from the digging tip or forwardmost working edge 40 of the point rearward in the direction of the adapter 32. Thus, as will be quite evident from FIG. 5, the blade portion or digging end of the point 31 is wedge-shaped in its external contour, and the purpose of this is to facilitate entry and penetration of the point into the ground.

The end of the point or cap that is to be mounted on the adapter is hollow in nature and hence is of socket form, and has a specific internal geometry explained in detail hereinafter. Thus, the socket section of the point includes a continuous wall 45 having an external contour of oval or elliptical geometry as will be evident in FIG. 7. The wall 45 is tapered in a forwardly convergent direction proceeding from a wide open or rear throat end 46, FIG. 5, into which the adapter nose is inserted as hereinafter explained, toward the working edge 40. In this sense, and in the section as viewed in FIG. 5, the socket portion of the point 31 is frustum in nature.

The area of external mergence of the socket portion and the digging end portion of the tooth includes aspects of the external geometry of both. Thus, the medial area of the length of the point includes four circular triangles 50 and four regular triangles 51, and hence this medial area displays a dual character so far as entry into and movement through the earth is concerned.

In further explanation of the foregoing, by having the socket or rear portion of the port of external oval form, streamline features are embodied therein, and resultantly the tooth as a whole will move through the earth in a comparatively easy fashion as indicated in FIG. 3. The digging end, being blade-like and rectangular in section will easily penetrate the ground, and the medial section of the tooth, which embodies both the external contour of the digging end of the tooth and the socket portion, eases the socket portion into the ground.

The interior of the socket end of the point is configured complemental to the interfitting nose portion 60 of the adapter 32, FIG. 9. Thus, the adapter nose 60 includes, FIGS. 5 and 9, a flat end 61 which will, in the tooth assembly, be immediately opposite the base or bottom 62 of the socket opening in the point, but a slight amount of space is established therebetween as shown in FIG. 5, to permit a good fit between the external wedge-shaped surfaces of the point and adapter that interfit.

The sides of the adapter nose rearward of the flat end 61 diverge as shown in FIG. 9, and the interior of the socket of the cap is rearwardly divergent in a complementary fashion as shown in FIG. 9. Moreover, the external contour of the adapter nose immediately rearward of the flat end 61 is octagonal as will be evident in FIG. 8. Thus, this section of the adapter nose includes, in an octagonal array, eight flat sides including opposed flats 63, FIG. 8, a pair of opposed flats 64 in planes normal octagonal tray, eight flat sides including opposed flats 65, approximately at 45° angles joining the flats 63 and 64. The interior or socket of the cap, in like fashion, includes eight flat seats 68 in an octagonal array and which are respectively complemental to the flats 63, 64 and 65.

The four flats 63 and 64 are continuous from the end 61 of the adapter nose rearward to the enlarged head or base 70 thereof and merge into the base 70 at a radius 71 as will be evident in FIG 9. In contrast to the continuity of the flats 63 and 64, the intermediate flats 65, that complete the octagonal external section of the adapter nose, are in effect shortened and cut back along planes parallel to the planes 63, FIGS. 9 and 10, to produce triangular shaped ledges 75, FIG. 9. Such shortening and cutting back of the surfaces 65 also results in flats 76, FIG. 10, which are normal to the flats 75, that is, parallel to the surfaces 63. Thus, the nose of the adapter includes four right-angled recesses or shoulders 75–76 at the rear of the adapter nose.

Viewing the adapter nose from one side, with FIG. 5 turned so that the center line of the tooth assembly is in a horizontal attitude, it will be observed that the flats 63 diverge approximately at 15° angles, and of course the side flats 64 are in true vertical planes. The flats 65, on the other hand, FIG. 8, are inclined at 45°, and the shoulders 75 that extend rearward therefrom are in true horizontal planes, that is, at 90° to the side flats 64.

The socket portion of the point includes an internal geometry that is a true complement of what has been described above with respect to the adapter nose. Thus, referring to FIG. 11, the interior of the socket of the point includes upper and lower rearwardly diverging flat surfaces 80, inclined at an angle of about 15° to the horizontal, which is the complement of the inclination of the flats 63 of the adapter nose  The socket portion of the point includes rearwardly diverging or spread side flats 81 that will be opposite the flats 64 of the adapter nose, four relatively narrow flats 82 on the 45° slope of the intermediate flats 65 of the adapter nose, and four surfaces 85 that will mate with the surfaces 75 of the adapter nose when the parts are interfitted. It will be observed in FIG. 11, that projections of the planes of the wall surfaces 80 and 81 intersect at substantially right angles, and are occupied inboard of these intersections, and said wall surfaces 80 and 81 are separated by lugs or shoulders 86 hereinafter defined.

It may be observed at this point of the disclosure that the four surfaces 85 within the socket represent inwardly facing surfaces of four substantially right-angled lugs 86. The lugs 86, in addition to the surfaces 85, present flat surfaces 87 that are at substantially right angles to the flat surfaces 85, and the flat surfaces 87 will, in the assembly, abut the flats 76, FIGS. 5 and 10. Thus it will be seen that the substantially right angled recesses 75–76 in the adapter nose receive complementally the internal substantially right angled shoulders or lugs 86 of the point.

The lugs 86 are in effect thickened parts of the socket portion of the point, where otherwise there would be a quite thin and weak shell. Thus, the lugs 86 strengthen the socket end of the point, and the nose portion of the adapter is configured to accommodate the lugs 86. As a consequence of this, very sturdy bearing surfaces are created that interlock in the assembly, and another consequence is that these interfitting parts assure against twisting of the point about the longitudinal axis of the adapter. Furthermore, the flat horizontal surfaces 85 of the lugs 86 assist in accurately seating the point on the adapter and prevent excessive binding due to what is mostly a wedge fit between the point and the adapter.

Reference was made above to the radius 71 which separates the nose portion of the adapter from the head thereof. As shown particularly in FIG. 5, the end portions of the point which lie between the lugs 86 are likewise formed with a radius 88. Additionally, a pair of projections or tangs 90 extend rearwardly from the side walls of the point and are adapted to seat in corresponding complementally shaped depressions 92 in the head 70 of the adapter, thereby to resist tipping of the point transverse to the longitudinal axis of the adapter.

As best shown in FIG. 9, the head 70 of the adapter is enlarged relative to the nose portion 60 thereof, such that when the point is seated on the adapter nose 60, FIG. 5, the exterior of the enlarged adapter head 70 appears as a continuation of the exterior of the socket end portion of the point 30. Thus, the enlarged head 70 of the adapter affords an annular shoulder 93, FIG. 5, which will be directly opposite the end wall 46 at the open end of the socket end of the point, although there is a slight separation as will be apparent in FIG. 5 sufficient to afford some "take up" or creep of the point relative to the adapter during use of the point and assembly.

The point is replaceably held on the adapter by a retainer pin 94, FIG. 6, adapted to be removably seated in an opening 95 in the adapter nose, with the heads 94A of the retainer seated in opposed openings 96, FIG. 9, in the wall 45 of the point. The retainer 94 is yieldably seated between opposed parts of the point and the adapter, and to this end the retainer pin includes a pair of rigid spaced relatively movable parts 97 and 98 joined by a yieldable rubber block 99. The parts are configured so that the retainer element 98 and rubber block 99 in the assembly are under compression between the internal walls that define the opening 95 in the adapter nose, thereby to establish rearwardly applied retainer forces to the portions of the point engaged by the opposite ends 94A of the retainer.

The parts of the tooth can be separated merely by knocking the retainer 94 out of the passageway defined by the registered openings 95 and 96, and such an operation is performed when the point 31 is to be separated from the adapter 32 incidental to reversing the point on the adapter or applying a new point to take the place of an old point worn beyond an acceptable state.

The head 70 of the adapter includes opposed top and bottom surfaces 105, FIG. 5, which lie in the projection of the oval exterior wall 45 of the point. The side walls of the adapter head at 106 are in the plane of the outer surfaces of the lugs 90 that project rearward from the point, and from thence are tapered slightly inwardly at 107.

The embodiment of the present invention thus far described is one wherein the adapter 32 is a separate part to be welded to the end of the shank 20. Accordingly, the end of the adapter, remote from the face 61, is tapered inwardly at 110 enabling generous weld deposits W, FIGS. 2 and 3, to be established between the tapered end 110 of the adapter and the adjacent surface of the shank 20.

As noted above, the adapter 32 is one that is cast as a separate part and configured to be joined to the working end of the shank 20 by weld material. However, and referring to FIGS. 12 and 13, the adapter can be cast as an integral part 32' of an accordingly modified shank 20A and presenting otherwise all aspects of the geometry of the adapter 32 described above, enabling point 30 to be related thereto in the manner described above.

It will be seen from the foregoing that a tooth constructed under and in accordance with the present invention, for earth moving equipment, embodies a point having a substantially blade-like digging end and a frustum-like socket end, considered from the standpoint of external geometry serving the purpose of facilitating entry of the tooth into the ground and movement through the ground. The medial section of the point lying between the digging end and the socket end embodies the geometry of both. The interior of the socket portion of the point is ruggedly constructed particularly where the shell would otherwise be thin, and resultantly, there is quite effective bearing contact between the point and the adapter enabling the point to withstand the digging forces involved while at the same time establishing resistance to tendencies for the point to twist or cant on the adapter when the tooth is being moved into or through the earth.

Hence, while I have illustrated and described preferred embodiments of the present invention, it is to be understood that these are capable of variation and modification, and I therefore do not wish to be limited to the precise details set forth, but desire to avail myself of such changes and alterations as fall within the purview of the following claims.

I claim:

1. In a digger tooth, a point having a blade end and a socket end, said socket end having a hollow interior and a rounded exterior, the interior of the socket including a plurality of opposed flat walls the planes of which when projected intersect at right angles, said intersections being occupied and said walls being separated by inwardly directed substantially right angled shoulders each presenting a pair of surfaces substantially at right angles to the adjacent ones of said walls and adapted to engage complemental surfaces of an adapter and which afford increased wall thickness of said intersections, said opposed flat surfaces being inwardly converging to maintain the wall thickness with said rounded exterior.

2. In a digger tooth, a replaceable point adapted to be mounted on an adapter and reversed thereon when desired, and removed and replaced by a like tooth when worn, and an adapter for the tooth, said point comprising a digging end portion rectangular in section and inclusive of a narrow forwardmost blade edge and side walls and top and bottom walls diverging from one another rearwardly of the blade edge, said point further comprising a frustum-like socket portion presenting an oval exterior wall joined to the first-named walls at a medial section that presents geometry that is inclusive of both the digging and the socket portion of the tooth, said socket portion having a hollow interior that extends from an open rear end to a terminal end wall within the point aligned approximately with said medial section, said hollow interior being defined by four rearwardly diverging walls the planes of which when projected intersect at right angles, said intersections being occupied and said walls being separated by inwardly directed right angled shoulders each presenting a pair of surfaces substantially at right angles to the adjacent ones of said walls and adapted to engage complemental surfaces of said adapter and which afford increased wall thickness at said intersections, and said adapter including a nose presenting an exterior geometry that is the full complement of the socket interior of the point.

3. A digger tooth point adapted to be fitted replaceably on an adapter and comprising a blade end portion terminating in a working edge and a socket end portion, said blade end portion being characterized by opposed substantially flat exterior surfaces that diverge from a narrow forwardmost edge rearwardly in the direction of the socket end of the tooth for penetrating the ground, said socket end portion having a hollow interior enabling the tooth point to be replaceably mounted on an adapter and an oval exterior the minor axes of which are substantially parallel to said working edge thereby enabling the socket end of the tooth to move as a streamlined body through the ground penetrated by the tooth point, the blade and socket portions of the tooth point merging at a medial section of the tooth point which displays both the flat feature of the blade and the oval feature of the socket facilitating penetration of the socket portion of the tooth point into the ground, said hollow interior portion having interior walls converging forwardly, and said oval exterior tapering forwardly.

4. A digger tooth point adapted to be fitted replaceably on an adapter and comprising a blade end portion terminating in a working edge and a socket end portion, said blade end portion being characterized by opposed substantially flat exterior surfaces that diverge from a narrow forwardmost edge rearwardly in the direction of the socket end of the tooth for penetrating the ground, said socket end portion having a hollow interior enabling the tooth point to be replaceably mounted on an adapter and an oval exterior the minor axes of which are substantially parallel to said working edge thereby enabling the socket end of the tooth to move as a streamlined body through the ground penetrated by the tooth point, the blade and socket portions of the tooth point merging at a medial section of the tooth point which displays both the flat feature of the blade and the oval feature of the socket facilitating penetration of the socket portion of the tooth point into the ground, the exterior of the blade being substantially rectangular in cross-section, said oval exterior surface tapering forwardly, said hollow interior converging forwardly to maintain a uniform wall thickness with said exterior, the interior of the socket portion of the tooth point being defined by a plurality of substantially right-angled shoulders interfittable with complemental recesses of an adapter.

5. A digger tooth point adapted to be fitted replaceably on an adapter and comprising a blade end portion terminating in a working edge and a socket end portion, said blade end portion being characterized by opposed substantially flat exterior surfaces that diverge from a narrow forwardmost edge rearwardly in the direction of the socket end of the tooth for penetrating the ground, said socket end portion having a hollow interior enabling the tooth point to be replaceably mounted on an adapter and a forwardly tapering outer surface the minor axes of which are substantially parallel to said working edge thereby enabling the socket end of the tooth to move as a streamlined body through the ground penetrated by the tooth point, the blade and socket portions of the tooth point merging at a medial section of the tooth point which displays both the flat feature of the blade and the oval feature of the socket facilitating penetration of the socket portion of the tooth point into the ground, the exterior of the blade being substantially rectangular in cross-section and the exterior of the socket being substantially elliptical in cross-section, said medial portion having rounded corners extending towards said blade end from said socket end portion, and said medial portion having flat portions extending from said blade end toward said socket portion, said hollow interior having converging interior walls to maintain a uniform wall thickness with said forwardly tapering outer surface.

References Cited by the Examiner

UNITED STATES PATENTS

| | | | |
|---|---|---|---|
| 711,992 | 10/02 | Mason | 37—141 X |
| 2,435,846 | 2/48 | Robertson | 37—142 |
| 2,689,419 | 9/54 | Daniels et al. | |
| 2,772,492 | 12/56 | Murtaugh | 37—142 |
| 2,797,505 | 7/57 | Rogers | 37—142 X |
| 2,915,290 | 12/59 | Petersen | 37—142 X |
| 3,006,089 | 10/61 | Johnson | 172—699 X |
| 3,079,710 | 3/63 | Larsen et al. | 172—762 X |
| 3,117,386 | 1/64 | Ferwerda | 37—142 |

T. GRAHAM CRAVER, *Primary Examiner.*

ABRAHAM G. STONE, *Examiner.*